June 9, 1959 A. J. PEARSON ET AL 2,890,147
METHOD OF MAKING METAL-REINFORCED BOARDS OF MINERAL FIBERS
Filed Dec. 23, 1954
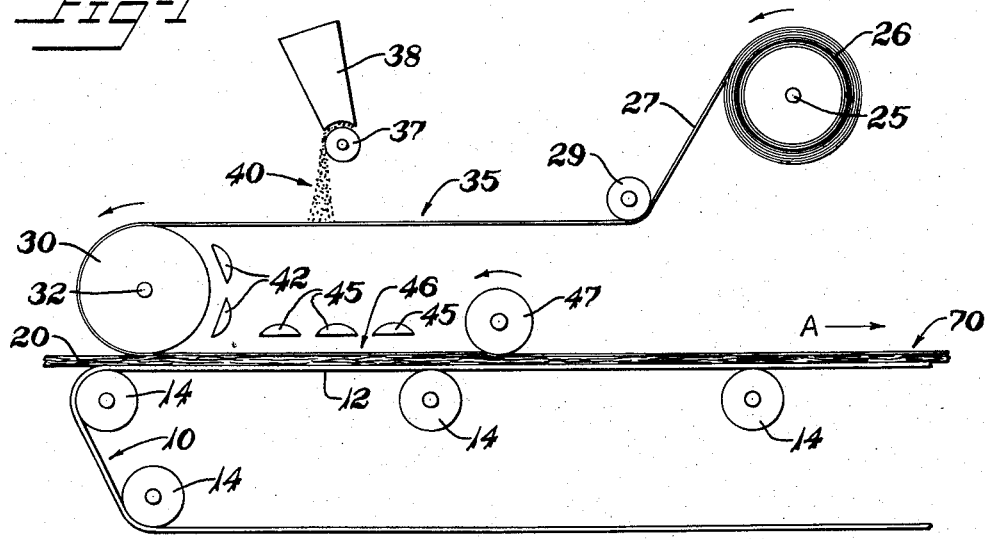
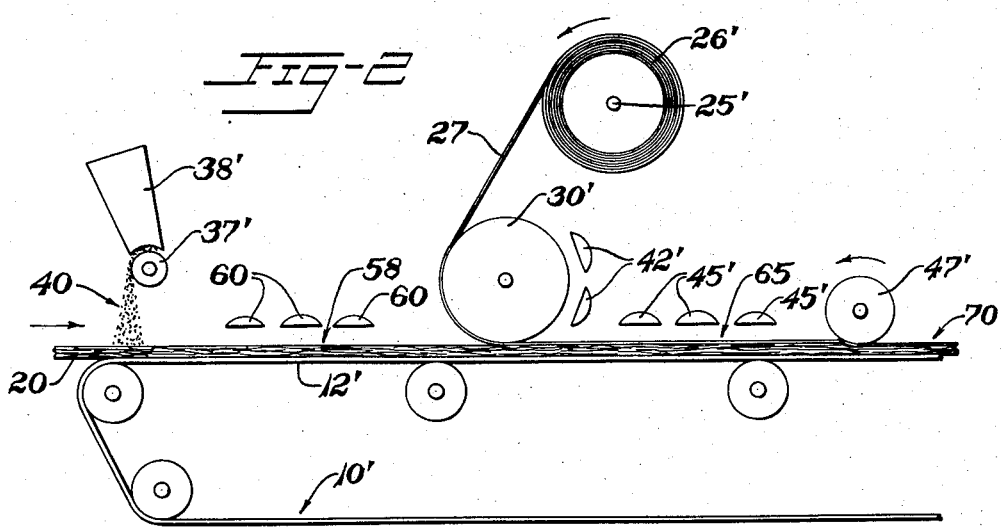
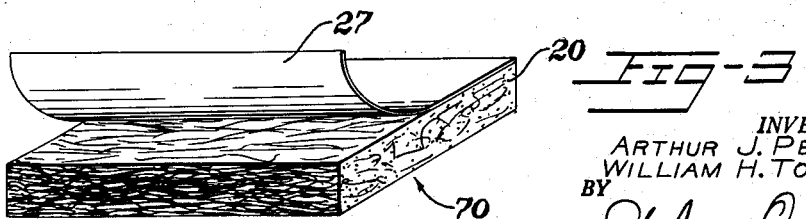
INVENTORS
ARTHUR J. PEARSON
WILLIAM H. TOMLINSON
BY
ATTYS.

United States Patent Office 2,890,147
Patented June 9, 1959

2,890,147

METHOD OF MAKING METAL-REINFORCED BOARDS OF MINERAL FIBERS

Arthur J. Pearson, Kansas City North, Mo., and William H. Tomlinson, Kansas City, Kans., assignors to Owens-Corning Fiberglas Corporation, a corporation of Delaware Application December 23, 1954, Serial No. 477,242

4 Claims. (Cl. 154—122)

This invention relates to a method and apparatus for producing a reinforced fibrous body and, more especially, to a method of manufacture of a mat or body of mineral fibers reinforced or faced with metal sheeting or foil.

Mats of mineral fibers, for example, fibers formed from glass, slag or fusible rock, have been used conventionally for industrial installation. The mats, when compressed to highly dense form and bonded to retain the fibers in a state of compression, have been used as form boards for roof constructions and for side wall installations of buildings. While having substantial strength characteristics, the fibrous form boards are sometimes used in comparatively large sheets, for example, sheets of a size spanning the spaces between purlins of a roof construction, and it is found that some sagging of the form boards may be encountered in such installations. In certain building wall, roof and ceiling constructions, it has been a practice to provide separate moisture barriers in the form of strips of metal foil or metal sheets to interrupt or prevent passage of moisture through the wall, ceiling or roof structures.

The present invention embraces the provision of a method of manufacture of a fibrous form board wherein a mass or group of mineral fibers bonded to form a board-like article is reinforced by a layer of metal sheeting or foil which is joined by a bonding resin to the fibrous body in a manner to greatly enhance and increase the strength characteristics of the article.

Another object of the invention embraces a method and apparatus for producing a metal-reinforced body of mineral fibers wherein a nonaqueous bonding medium or resin is applied to the fibrous body or metal reinforcement, the fibrous body and reinforcement being brought together in a manner whereby the bonding medium may be cured to adhesively join the reinforcement to the fibrous body.

Another object of the invention is the provision of a method of manufacturing a composite article of mineral fibers and metallic surface layer involving the steps of continuously advancing a layer of fibrous material and at the same time advancing a layer of foil, applying a nonaqueous resinous bonding material to one or both of the layers and applying heat to the assembly of layers and bonding material to cure the material to form an integrated product.

Another object of the invention is the provision of a method of reinforcing a fibrous body by assembling metal foil into contiguous relation with a fibrous body, applying a one-step bonding resin in powdered form and curing the resin whereby the metal foil is permanently joined or bonded to the fibrous body.

Another object of the invention is the provision of a method of continuously feeding a strip of metal foil into engaging relation with a continuously advancing fibrous body and wherein a resin is applied to the strip of foil or the body and heated to a semifluid state prior to engagement of the foil and fibrous body and curing the resin under heat and pressure to form a tenacious bond or juncture between the metal foil and the fibrous body.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

Figure 1 is a semidiagrammatic illustration of apparatus for carrying out steps in the method of the invention;

Figure 2 is a semidiagrammatic view of an arrangement for carrying out a modified form of method of the invention, and Figure 3 is an isometric view illustrating an article of manufacture or product made according to the method of the invention.

While the method of the invention is particularly usable for facing or reinforcing a fibrous mat or body with metal foil or metallic sheeting, it is to be understood that the method may be employed for other purposes wherever the same may be found to be applicable.

With particular reference to Figure 1, there is illustrated diagrammatically an arrangement for carrying out the steps of one form of method of the invention. A means is provided for supporting a fibrous mat or body including a movable conveyor 10, the upper flight 12 of which forms a support for the mat or body. The conveyor 10 is mounted upon rollers 14, one or more of which may be driven rollers in order to continuously move the conveyor in the direction of the arrow "A" to continuously advance the fibrous mat or body through the processing zones.

The method of Figure 1 is particularly applicable for the deposition or application of a layer or sheet of metal foil to a preformed or precompressed fibrous mat 20 of comparatively high density and of semirigid character. The mat or fibrous board 20 is formed in a conventional manner by means (not shown) wherein streams of molten mineral material, such as glass, are attenuated to fibers by high velocity gaseous blasts, the attenuated fibers collected into a mass and a resinous binder, such as phenolformaldehyde or ureaformaldehyde, sprayed or applied to the mass of glass fibers. The binder-impregnated mass of fibers is compressed to a density of from six to twelve pounds per cubic foot, and the binder therein is cured to form a rigid fibrous body or board of substantially uniform thickness. Fibrous boards of this character may be from one-half inch to two inches or more in thickness.

The fibrous body or board 20 is continuously formed in the above manner and is delivered at a constant speed onto the upper flight 12 of the moving conveyor 10 in completely formed and precured condition. Disposed adjacent the conveyor 10 is a means for applying a metal sheet or layer or metal foil to the mat, fibrous layer or form board 20 and for bonding the metal sheet, layer or metal foil to the fibrous body, layer or mat. Disposed above the conveyor 10 is a mandrel or shaft 25 which supports a supply or roll 26 of aluminum foil, lead foil or other metallic sheeting for application to the fibrous body or layer 20.

The continuous sheet 27 of metal or foil from the roll 26 passes beneath a guide roll 29 and around a heated roll 30, the latter being journalled for rotation upon a shaft 32. Driving means (not shown) may be provided for rotating the roll 30, if desired, although the bond between the metal foil and the fibrous mat or body is of sufficient strength whereby the advancing mat may be utilized to pull or withdraw the foil from the supply roll 26 without establishing an independent drive to the roll 30. The member or roll 30 is disposed so as to guide the metal sheet or foil 27 into contiguous, substantially parallel relationship with one face of the fibrous mat or body 20 whereby surface engagement and full area of contact are established between the metal foil and the fibrous body during assembly.

The method of the invention includes the application of a bonding resin, such as a so-called "one-step" phenolformaldehyde resin, or a resin of this character combined with a resin composition commercially known as Vinsol which, when mixed with phenolformaldehyde resin, forms a reliable and permanent bond, joining the metal layer, sheet or foil 27 to the fibrous layer or body 20. As shown in Figure 1, there is disposed above a horizontal zone 35 of the metal foil or sheet a resin-applying means or applicator 37 associated with a hopper 38 containing a supply of bonding resin.

It is preferable in the method of the invention to utilize a powdered resin which is heat-curable and of a nonaqueous character, devoid of solvents which would have to be volatilized and evaporated in curing or setting up the bonding resin. The applicator 37 is arranged to continuously deposit the requisite powdered bonding resin 40 upon the horizontal zone 35 of the metal foil or layer as the foil or layer of metal is advanced at a continuous linear speed equal to the linear speed at which the flight 12 of the conveyor advances the mat or fibrous layer 20. In utilizing powdered resin, it is preferable to apply a precuring heat to convert the powdered resin to a gelatinous, semifluid or jelled state or condition prior to its contact or engagement with the fibrous body or layer. As shown in Figure 1, heating means 42 are provided adjacent the periphery of the roll or cylinder 30 for heating the peripheral surface thereof which, through engagement with the metal layer or foil 27, transmits or conveys heat to the powdered resin distributed on the metal layer or foil. The surface of the roll 30 is heated to a temperature which reduces the powdered resin to a jell or semifluid stage so that, upon contact of the foil or layer 27 with the upper surface of the fibrous body or layer 20, the gelatinous resin is sufficiently flowable to penetrate into the interstices at the adjacent surface or portion of the fibrous body or mat. The layer of metal or foil, being in contiguous contact or relation with the fibrous body 20, is conveyed with the fibrous body by the flight 12 of the conveyor through a heating zone in which are provided heaters 45 for directing heat onto the foil so as to finally cure or set up the bonding resin. A pressure roll 47 or other pressure means is employed to establish comparatively low pressure upon the foil so as to obtain an intimate contact of the bonding resin with the foil and the fibrous body during the curing of the resin as the assembly moves through the heating or curing zone 46. The heaters 42 and 45 may be of any suitable type, such as radiant heaters, flame heaters or electric induction heating means or devices.

The fibrous body 20 and the foil 27 assembled therewith are advanced at a substantially continuous speed at a rate sufficient for the heat from the heating means 45 to cure or set the bonding resin.

Figure 2 illustrates in semidiagrammatic form an arrangement for carrying out a modification of the method described above. In this arrangement there is provided a conveyor 10', the upper flight 12' of which supports a fibrous body, layer or mat 20 formed of mineral fibers, for example, glass fibers, the mat having been previously impregnated with a suitable bonding resin, compressed to the desired thickness and cured to provide a substantially rigid body. Disposed above the conveyor 10' is an arbor or mandrel 25' upon which is mounted a supply roll 26' of metallic material such as aluminum foil or similar material 27. The foil 27 is conducted around a guide roller or cylinder 30' disposed above the mat 20 and arranged whereby the foil 27 is brought into engaging relation in parallelism with the fibrous body 20.

In this method the powdered resinous binder 40 is preferably deposited upon the upper surface of the advancing fibrous body 20 before the fibrous body is moved into engagement with the metal foil 27. The powdered resin 40 is distributed and discharged onto the mat or fibrous body 20 by means of an applicator 37', the powdered resin being contained within a supply hopper 38'.

The mat 20 and the resin 40 deposited upon the upper surface of the mat are moved into and through a preheating zone 58 in which sufficient heat is supplied from heaters or heating means 60 to cause the powdered resin to become gelatinous or be in a semifluid state. The resin is preheated and brought to a gelatinous or highly viscous consistency prior to engagement of the metal foil 27 with the resin on the surface of the mat 20 whereby the resin in a semifluid state is well distributed over the face or surface of the fibrous body or mat 20 and is in a tacky condition such that it will adhere to the foil 27 when the latter is brought into engagement therewith. It is to be understood that the heaters or heating means 60 may be flame heaters, radiant heaters, electrical induction heating devices or other type of heating unit suited to the purpose.

The cylindrical roll 30' which is of metal construction is heated by means of heaters 42' of any suitable type. The heaters 42' impart heat to the peripheral surface of the roll 30' so that as the metal foil 27 moves into engagement with the roll 30' it is heated before it is brought into contact or engagement with the resin in a gelatinous state on the mat 20 so as to foster the adherence of the resin to the metal foil 27.

The assembled mat or fibrous body and foil are continuously advanced or conveyed through a heating zone 65 in which a plurality of heaters 45' of any suitable type direct or radiate sufficient heat onto the foil 27 and the mat or body 20 to finally cure or set the resin, permanently joining the foil sheet or metal layer 27 with the mat or fibrous layer 20. In order to establish a good contact of the foil and the mat with the adhesive or binder, pressure means in the form of one or more pressure rollers, one of which is indicated at 47', engage the outer surface of the foil or metal layer 27 and exert pressure upon the foil and the mat to accomplish the stated purpose. The foil and mat assembly after curing of the powdered resin may be cut into suitable lengths for particular building installations as may be required. The finished product formed by the foregoing, described methods is indicated at 70 and is illustrated in Figure 3 wherein the sheet or layer of foil 27 is bonded by the adhesive to the mass, mat or layer 20 of mineral fibers through the cured or set adhesive or bonding medium.

The preformed mat or body of mineral fibers 20 contains a suitable binder such as phenolformaldehyde and the fibers forming the mat or body are compressed to the desired thickness and the binder cured to form a substantially rigid, board-like body. For example, a mass of mineral fibers, for example, glass fibers, impregnated with phenolformaldehyde is compressed to a thickness of from one-half to two inches or more and may be of a density of from six to twelve pounds per cubic foot.

The metallic layer or foil may be of any suitable thickness, depending upon the use or uses to which the finished product is to be employed, and is preferably from .008" to .050" in thickness. The powdered resin 40 utilized as the binder or bonding medium between the metal layer and the fibrous body may be of phenolformaldehyde, urea formaldehyde or a combination of these resins or a combination of phenolformaldehyde and Vinsol, the latter being a pine distillate resin having good bonding characteristics. Vinsol is the trade name of a resin defined as extracted pine wood pitch and is a black residue remaining after rosin is extracted through the use of petroleum solvents.

By applying the powdered resin to the foil or the fibrous body or both and applying heat to render the resin semifluid prior to assembling the foil on the fibrous body, the gelatinous or semifluid state of the binder facilitates its distribution and dispersion over the surface and permits it to permeate the interstices or voids in the prebonded fibrous body so that, upon final curing of the powdered resin or binder, the foil or metal layer is integrally bonded or joined to the fibrous body or layer whereby the resulting product has exceptionally high strength characteristics as compared with a product without a facing or reinforcing layer of metal. The high strength characteristics of the product are believed to be due in part to the concentration of bonding resin in the surface fibers of the fibrous body whereby the surface fibers are held in oriented relation, and the concentration of resin provides an integrating factor between the fibrous body and the facing layer of a character which resists deformation of the product. The concentration of heat during final curing occurs adjacent the foil due to its high heat conducting properties and the bonding resin tends to migrate toward the zone of highest temperature. This characteristic concentrates the bonding resin at the zone of engagement of the metal foil with the fibrous body and further improves the strength of the product. The metal layer or foil forms a reinforcement for the fibrous body without appreciably increasing the weight of the body.

It is to be understood that a perforated metal layer, sheet or foil may be bonded to a fibrous body by the above-described methods in the same manner that an imperforate sheet or layer may be applied. The product incorporating an imperforate sheet of metal is admirably adapted to form a moisture barrier.

Form boards of the character fabricated by the method of the invention not only have high strength characteristics but have high acoustic qualities and are fireproof.

It is to be understood that the resin 40 employed as the bonding agent or medium between the metal layer and the fibrous body should be of a character compatible with the resin or binder in the preformed fibrous body 20 to form a good bond. The composite product or finished form board may undergo expansion and contraction due to temperature variations without liability of delaminating the metal layer or foil from the body of fibers.

The sizes of the fibers making up the dense fibrous body are preferably in the range of .00050" to .00060" in diameter, the average size being about .00055". The fibers in the prebonded fibrous body are of varying lengths, a condition which enhances the strength of the prebonded fibrous body or mat 20.

Through the step of heating the powdered resin sufficiently to reduce it to a semifluid or gelatinous condition, the resin is readily dispersed or distributed over the entire surface to which it is applied so as to provide a juncture or joining means between the fibrous body and the metal layer or foil effective throughout the entire area of the contiguous surfaces thereof. By reason of the concentration of bonding resin or medium between the metallic facing layer and the fibrous body, this bond is of greater strength than the bond holding the fibers of the fibrous body 20 together. This construction reduces the liability of the metal facing layer to separate from the mass or body of fibers in the end product.

It is apparent that, within the scope of the invention, modifications and different arrangements may be made other than is herein disclosed, and the present disclosure is illustrative merely, the invention comprehending all variations thereof.

We claim:

1. The method of producing a metal-faced mat of mineral fibers including continuously advancing a mat of mineral fibers in which the fibers are prebonded in the mat, continuously advancing a layer of metal foil from a supply in a direction substantially parallel to and opposite to the direction of movement of the advancing mat, feeding powdered binder onto the upper surface of the layer of foil, passing the layer of foil around and in direct contact with a curved surface to cause the layer of foil to advance in the same direction as that of the mat, heating the curved surface, transferring heat from the curved surface to the layer of foil by conduction to disperse the binder over the surface of the layer of foil, engaging the binder-bearing surface of the layer of foil with a major surface of the mat while the layer of foil is in contact with the curved surface, advancing the assembly of mat and foil layer to a curing station, and applying additional heat at said station to cure the binder and adhere the layer of foil to the mat.

2. The method of producing a metal-faced mat of mineral fibers including continuously advancing a mat of glass fibers in which the fibers are prebonded in the mat, continuously advancing a layer of metal foil from a supply in a generally horizontal direction substantially parallel to and opposite to the direction of movement of the advancing mat, feeding powdered binder comprising phenolformaldehyde and a pine distillate resin onto the upper surface of layer of foil at the horizontal region thereof, passing the layer of foil partially around and in direct contact with a roll to cause the layer of foil to advance in the same direction as that of the mat, heating the roll, transferring heat from the roll to the layer of foil by conduction to disperse the binder over the surface of the layer of foil, engaging the binder-bearing surface of the layer of foil with a major surface of the mat while the layer of foil is in contact with the roll, advancing the assembly of mat and foil layer to a curing station, and applying additional heat at said station to cure the binder and adhere the layer of foil to the mat.

3. The method of producing a metal-faced layer of mineral fibers including continuously advancing a layer of mineral fibers in which the fibers are prebonded in the formation of the layer, continuously advancing a layer of metal foil from a supply, depositing powdered bonding material on a surface of one of the layers, passing the layer of metal foil around and in contact with a curved surface disposed to engage the layer of metal foil with a major surface of the layer of mineral fibers while the layer of foil is in contact with the curved surface, heating the curved surface, transferring heat therefrom to the layer of metal foil by direct contact, continuously advancing the assembled layers of foil and mineral fibers with the bonding material between the layers to a curing station, and applying heat at the curing station to cure the bonding material to adhere the layers together.

4. The method of producing a metal-faced layer of mineral fibers including continuously advancing a layer of haphazardly arranged glass fibers in which the fibers are prebonded in the formation of the layer, continuously advancing a layer of metal foil from a supply, depositing powdered binder comprising phenolformaldehyde and a pine distillate resin on one of the layers, passing the layer of metal foil partially around and in contact with a roll disposed to engage the binder-bearing surface of the layer of metal foil with a major surface of the layer of glass fibers while the layer of foil is in contact with the roll, heating the roll and transferring heat therefrom to the layer of metal foil by direct contact, continuously advancing the assembled layers of foil and glass fibers to a curing station, and applying heat at the curing station to cure the bonding material to adhere the layers together.

References Cited in the file of this patent

UNITED STATES PATENTS

| | | |
|---|---|---|
| 1,551,318 | Logan | Aug. 25, 1925 |
| 1,978,807 | Merritt | Oct. 30, 1934 |
| 1,999,509 | Merritt | Apr. 30, 1935 |
| 2,404,904 | Collins | July 30, 1946 |
| 2,433,965 | Upson | Jan. 6, 1948 |
| 2,541,502 | Cross et al. | Feb. 13, 1951 |
| 2,577,205 | Meyer et al. | Dec. 4, 1951 |
| 2,612,462 | Zettel | Sept. 30, 1952 |
| 2,668,348 | Hubbell | Feb. 9, 1954 |
| 2,681,637 | Simpson | June 22, 1954 |
| 2,728,703 | Kiernan et al. | Dec. 27, 1955 |
| 2,736,362 | Slayter et al. | Feb. 28, 1956 |
| 2,744,044 | Toulmin | May 1, 1956 |
| 2,745,173 | Janos | May 15, 1956 |

FOREIGN PATENTS

| | | |
|---|---|---|
| 712,042 | France | July 13, 1931 |